United States Patent

Brandt

[11] Patent Number: 5,724,607
[45] Date of Patent: Mar. 3, 1998

[54] METHOD FOR REMOTE CONTROL MESSAGE TRANSMISSION DELAY COMPENSATION BY PROVIDING PSEUDO-RESPONSE MESSAGE BASED ON PRIOR RECEIVED RESPONSES STORED IN LOOK-UP TABLE

[75] Inventor: Anders Terje Brandt, Soborg, Denmark

[73] Assignee: RE Technology AS, Copenhagen, Denmark

[21] Appl. No.: 643,286

[22] Filed: May 8, 1996

[51] Int. Cl.$^6$ .................. G06F 3/00; G06F 9/00; G06F 11/30

[52] U.S. Cl. .......... 395/825; 395/878; 395/500; 395/852; 375/211; 348/722

[58] Field of Search .................. 395/825, 849, 395/852, 878, 879, 500; 325/211; 348/722, 734

[56] References Cited

U.S. PATENT DOCUMENTS

| | | | |
|---|---|---|---|
| 4,050,097 | 9/1977 | Miu et al. | 395/650 |
| 5,101,479 | 3/1992 | Baker et al. | 395/285 |
| 5,241,625 | 8/1993 | Epard et al. | 395/502 |

FOREIGN PATENT DOCUMENTS

| | | |
|---|---|---|
| 02-100445 | 4/1989 | Japan. |
| 01-129632 | 5/1989 | Japan. |
| 02-209047 | 8/1990 | Japan. |

*Primary Examiner*—Dinh C. Dung
*Attorney, Agent, or Firm*—Larson & Taylor

[57] ABSTRACT

Hereby is achieved a remote-control system which will allow any delay time in the transmission between the controlling unit and the controlled unit. The communication protocol is retained, the actual response is subjected to the delay in the transmission system, but the pseudo-response message is generated in advanced to satisfy the needs of the controlling unit. A typical area of use for the system is professional audio and video production.

8 Claims, 3 Drawing Sheets

METHOD FOR REMOTE CONTROL MESSAGE TRANSMISSION DELAY COMPENSATION BY PROVIDING PSEUDO-RESPONSE MESSAGE BASED ON PRIOR RECEIVED RESPONSES STORED IN LOOK-UP TABLE

TECHNICAL FIELD

The present invention relates to a method and an apparatus for use in a system comprising a controlling unit, e.g. a remote-control panel, and a controlled unit controlled by said controlling unit, the controlling unit sending control-unit messages (commands and/or requests) to the controlled unit and the controlled unit responding to these control-unit messages by sending response messages (acknowledgements and/or information words) back to the controlling unit. A typical area of use for such a system is professional audio and video production.

BACKGROUND ART

In remote control systems of this kind it is normally expected that the response messages are received by the controlling unit within a certain maximum acceptable delay time so that the controlling unit thereby is able to detect that the controlled unit has reacted to the control-unit messages and that the controlling unit is able to display the actual state and/or parameters for the controlled unit sent back in the response messages.

For normal in-house remote control, this maximum acceptable delay time could be as low as e.g. 1 millisecond and for remote control within a state like Texas e.g. 20 milliseconds. The actual delay of the response message measured from the time of sending the control-unit message will depend on the transmission delay from controlling unit to controlled unit and back and the delay in the controlled unit. A transmission in copper wire will propagate with a speed of 200,000 kms per second, corresponding to 2,000 kms in 10 milliseconds. Transmission via radio link will propagate with a speed of 300,000 kms per second, corresponding to 3,000 kms in 10 milliseconds. If the transmission takes place via satellite, the distance from controlling unit to satellite on to controlled unit and back will be 4×36,000 kms, corresponding to a delay of 480 milliseconds. This will normally be a longer delay time than accepted by the conventionally used controlling units and such controlling units will normally react to such a delay time by assuming an error to exist in the connection to the controlled unit and stop functioning until the assumed error has been resolved.

DISCLOSURE OF THE INVENTION

It is the object of the present invention to provide a method and an apparatus for use in a system of the above-mentioned kind, whereby the above-mentioned problems with delay times above the maximum acceptable delay time are solved and where controlling units can be used as they are without modification thereof. This is achieved by a method comprising storing and updating of a response table close to the controlling unit comprising control-unit messages previously sent from the controlling unit to the controlled unit and corresponding response messages previously received from the controlled unit in response to these control-unit messages and using this response table as a look-up table for generating a pseudo-response message to each control-unit message within the maximum allowable delay time accepted by the controlling unit, which pseudo-response message is the most recently received response message to the corresponding control-unit message.

By this method it is achieved, that the conventional controlling unit can be used in connection with unlimited distance transmission between controlling unit and controlled unit, without modification of the controlling unit and only introducing a dynamically updated response table close to the controlling unit which comprises control-unit messages previously sent from the controlling unit to the controlled unit and the corresponding response messages previously received from the controlled unit in response to said control-unit messages. The communication protocol is retained, the actual response is subjected to the delay in the system, but the pseudo-response message is generated in advance to satisfy the needs of the controlling unit.

In a preferred embodiment, the response table is updated by storing the control-unit messages in a message queue memory and taking the control-unit messages out of the queue when the corresponding response messages are received from the controlled unit, and these pairs of control-unit messages and response messages are then stored in the response table overwriting possible previous identical control-unit messages and corresponding, possibly diverging, previous response messages.

The look-up table function is carried out by using the control-unit message as a search parameter, and when an identical control-unit message is found in the table, the corresponding response message in the table is used as the pseudo-response message for the controlling unit.

BRIEF DESCRIPTION OF THE DRAWINGS

In the following detailed portion of the present description, the present invention will be explained in more detail with reference to a remote-control system in which the method according to the invention can be used, as shown in the drawings, in which.

DESCRIPTION OF THE PREFERRED EMBODIMENTS

Figure 1:
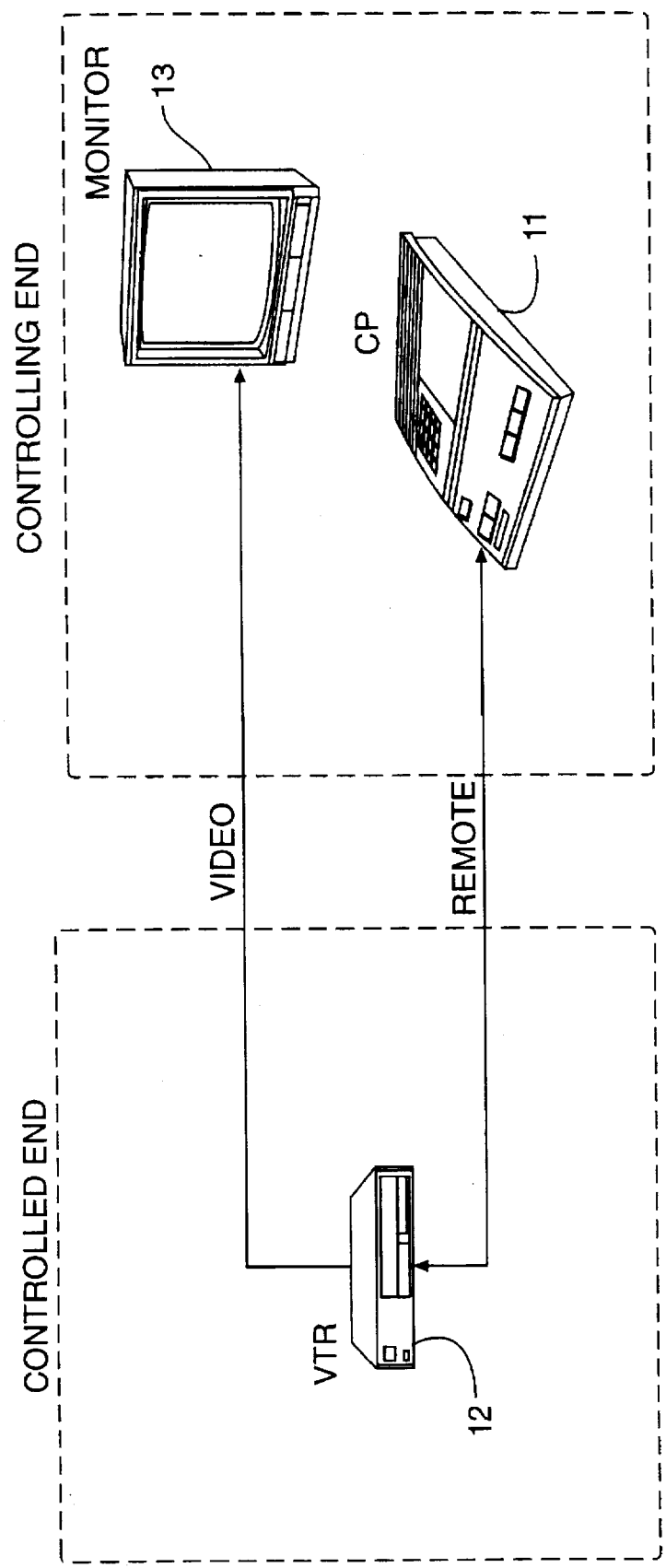
FIG. 1 shows a remote-control system comprising a control panel performing the function of a controlling unit, a video tape recorder and a monitor.

The system shown in FIG. 1 is a remote-control system in which a remote video tape recorder VTR 12 is controlled from a control panel CP 11 in connection with the VTR 12 via cable and where the video signal from the VTR 12 is displayed on a monitor 13 near the control panel 11.

This system functions as intended in an environment, where the distance between the control panel 11 and the VTR 12 is sufficiently small so that no problems occur due to delays of the control messages and response messages communicated between VTR 12 and control panel 11. In the system shown, the remote control may e.g. comply with "SMPTE" or "SONY®"-remote machine control standard (SMPTE: Society of Motion Picture and Television Engineers). In these standards, the control panel 11 functions as a master and the VTR 12 as a slave and the protocol for control-panel messages and VTR response messages is as follows:

The control-panel messages can be either commands or requests.

The VTR response messages can be either acknowledgements or information words.

Commands change a setting (e.g. reset time code display) or initiate a physical action (e.g. play, stop, record, etc.) in the VTR 12. The VTR 12 responds to a command by sending an acknowledgement message back to the control panel 11. The contents of an acknowledgement-response message is always the same.

Requests do not cause any actions in the VTR 12 but instruct the VTR 12 to send the requested information back to the control panel 11 in the form of an information word response message. The contents of information words normally change from one request to the next (e.g. running time code).

Furthermore, the protocol prescribes a maximum acceptable delay from sending a control-panel message until receipt of the corresponding VTR response message. In the "SONY®"-protocol, this maximum acceptable delay is 10 milliseconds.

Figure 2:
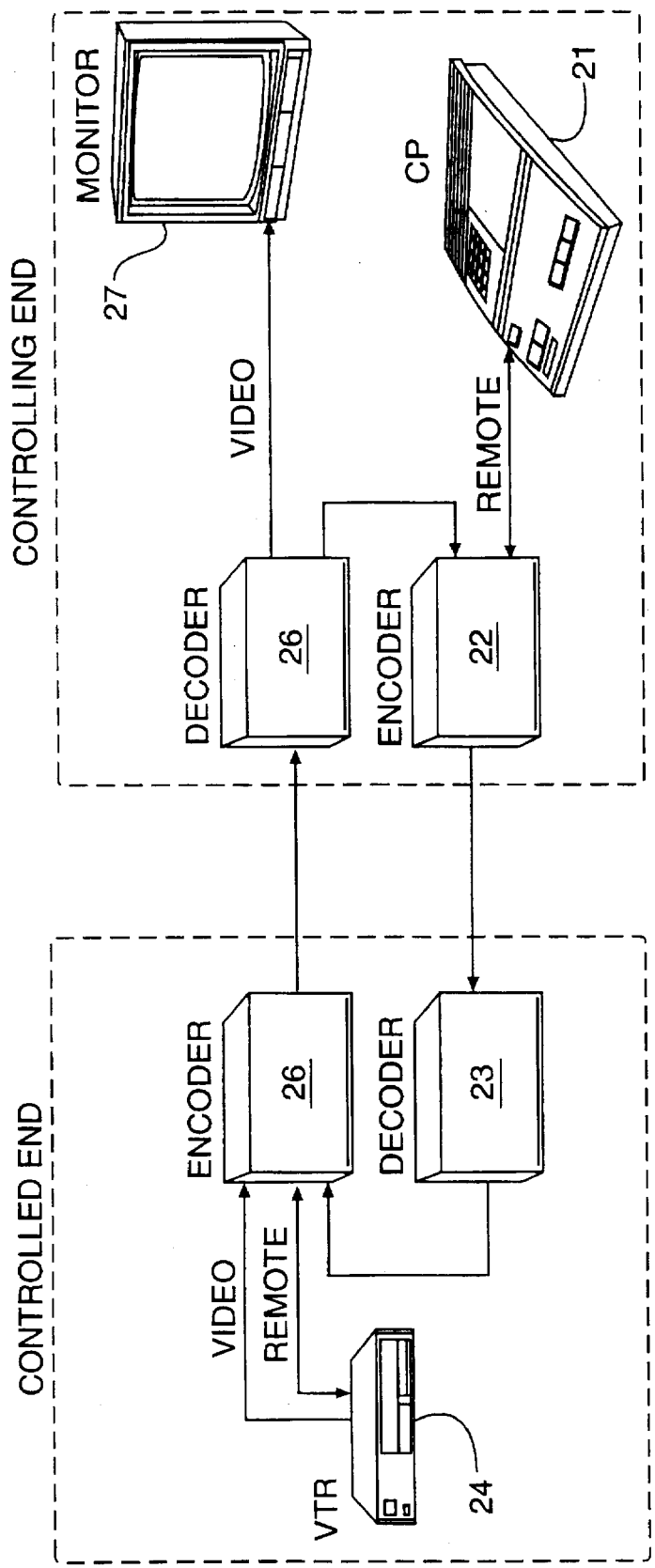
FIG. 2 shows the system in accordance with FIG. 1 but with transmission encoders and decoders inserted between the control panel/monitor site, i.e. the controlling end, and the video tape recorder site, i.e. the controlled end.

If the system is modified as shown in FIG. 2, by introducing a transmission link between control panel 21/monitor 27 and VTR 24, this will introduce a delay of the messages in the remote control connection due to delay in the four coders/decoders 22, 23, 25 and 26 and the distance between these, and this delay will exceed the maximum acceptable delay, when the distance is greater than approx. 1,000 km. It is in this situation that the method according to the present invention becomes relevant. In the system shown in FIG. 2, the control-panel messages are sent from control panel 21 to the controlling-end encoder 22 (e.g. RE3400/RE4500 Video Codec from RE Technology A/S, DK) which transmits the messages in a 384 kbit/s T' channel to the controlled-end decoder 23 (RE3400/RE4500), which extracts the message and sends it on to the controlled-end encoder 25 (RE3400/RE4500), for delivery of the message to the VTR 24. The VTR 24 reacts as usual to the message and sends its response message to the controlled-end encoder 25 (RE3400/RE4500) which transmits the messages in a 384 kbit/s T' channel to the controlling-end decoder 26 (RE3400/RE4500), which extracts the response message and sends it to the controlling-end encoder 22 for delivery to the control panel 21.

As described until this point, the system functions in the traditionally known way and will accept delays in the remote-control connection up to the maximum acceptable delay, e.g. 10 milliseconds.

When the delay in this transmission system is too long, e.g. longer than 10 milliseconds, the controlling-end encoder 21 should according to the present invention comprise a response table 42 (FIG. 4) which is used in the following manner.

It should be mentioned that the system in accordance with the present invention will also function with delays below the maximum acceptable delay.

All transmissions are as above but the response table 42 is used as a look-up table giving a pseudo-response message and the response table 42 is updated when the real response message is received.

Figure 3:
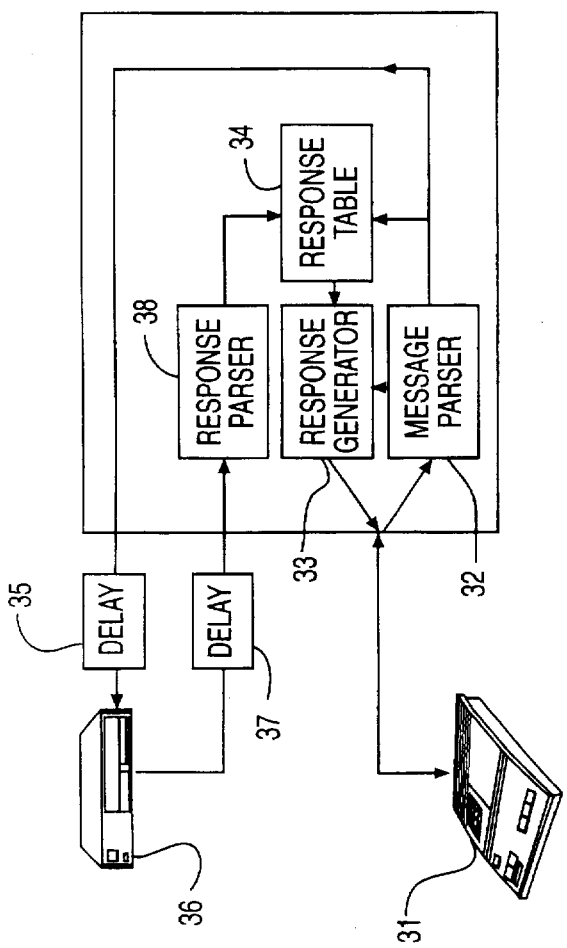
FIGS. 3 and 4 show an exemplary response table for use in connection with the method according to the invention.
Figure 4:
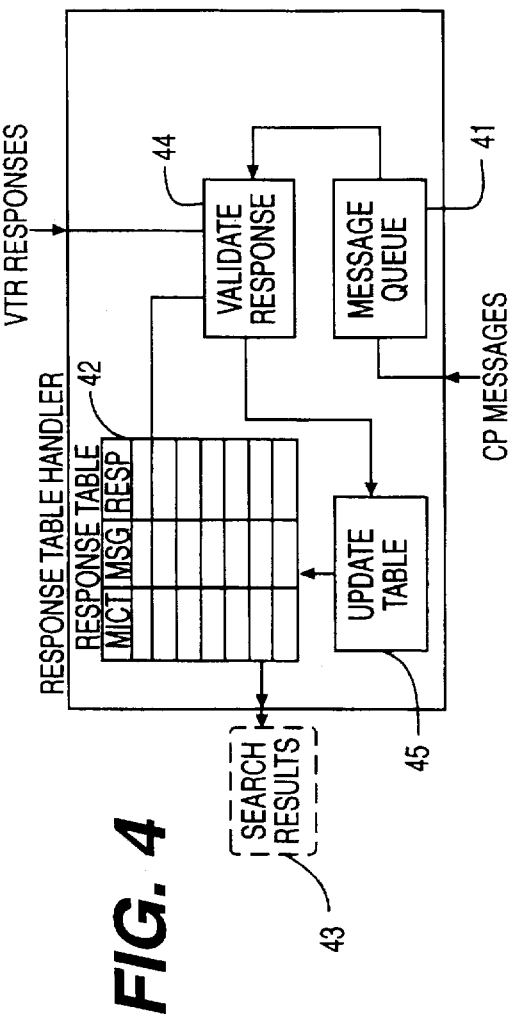

The updating of the response table and the use of the response table as a look-up table will be explained in further detail with reference to FIGS. 3 and 4.

The response table 42 contains all previously used control-panel messages Msg. and their corresponding response messages Resp. All control-panel messages are placed in a message queue 41. When response messages are received from the VTR, they are validated 44 by comparing their headers to previous response messages to the same control-panel message. If the validation is in order, the response messages are stored in the response table 42 together with the corresponding control-panel message.

When a response message is received from the VTR, a control panel message is retrieved from the message queue 41. The control-panel message is searched in the response table 42. If it is found, the current response message is compared to the response message just received from the VTR. If the response message headers are identical, the new response message is considered valid. The new response message is stored in the response table by an "update table" function 45.

When a response message is received from the VTR, a control-panel message is retrieved from the message queue 41. The control-panel message is searched in the response table 42. If it is not found, there is no previous response message to compare to the response message just received from the VTR. Therefore, the new response message is considered valid and is written into the response table by the "update table" function 45.

In order to be able to monitor the system performance, the system may continuously calculate and monitor error statistics. A "mismatch count" (MiCt) is introduced in the response table 42 for each control-panel message entry Msg. Whenever there is a mismatch between a control-panel message and VTR response message, the corresponding mismatch count entry is incremented. In case of no mismatch, the mismatch count entry is decreased (until 0). When the mismatch counter for one control-panel message entry in the table exceeds a predetermined value, the corresponding entry will be cleared and the counter will be re-initialized.

Furthermore, a "global mismatch count" (GLMICT) can be used for monitoring the overall state of the response table 42.

In the foregoing, the method according to the invention has been explained in connection with a specific remote-control system comprising encoders and decoders in connection with remote control of a VTR from a control panel. For a person skilled in the art it will be evident that the method according to the invention can be used in any remote-control system, wherein corresponding delay time problems occur.

One such remote-control system could be the system shown in FIG. 2, but modified in such a way that the transmission between the controlling and the controlled end comprises a bidirectional transmission system, wherein the controlling-end encoder 22 and decoder 26 are comprised in one unit and correspondingly the controlled-end encoder 23 and decoder 28 are comprised in one unit, the bidirectional transmission having a possibility of transmitting remote-control signals..

For a person skilled in the art it will, furthermore, be evident that the described transmission of the control and response messages in the 384 kbit/s T' channels could be performed in any other suitable channels.

What I claim is:

1. A method for use in a system comprising a remote controlling unit and a controlled unit controlled by said controlling unit, the controlling unit sending control-unit messages (commands and/or requests) to the controlled unit and the controlled unit responding to these control-unit messages by sending response messages (acknowledgements and/or information words) back to the controlling unit, and the controlling unit requiring the response messages back within a certain maximum acceptable delay time, wherein the transmission of messages from the controlling unit to the controlled unit and back comprises a total delay exceeding said maximum acceptable delay time and the method comprising storing and updating of a response table close to the controlling unit comprising control-unit messages previously sent from the controlling unit to the controlled unit and corresponding response messages previously received from the controlled unit in response to these control-unit messages and using this response table as a look-up table for generating a pseudo-response message to each control-unit message within the maximum acceptable delay time accepted by the controlling unit, which pseudo-response message is the most recently received response message to the corresponding control-unit message.

2. A method according to claim 1, wherein the updating of the response table comprises storing of the control-unit message in a message queue memory and when receiving the corresponding response message from the controlled unit storing the control-unit message and the associated response message in the response table, overwriting a possible previous control-unit message with associated response message with an identical control-unit message and an associated, possibly diverging, response message.

3. A method according to claim 2, wherein the updating of the response table further comprises validation of response messages before using these for updating the response table.

4. A method according to claim 2, wherein the updating of the response table further comprises
   incrementing a mismatch counter (MICT) for each control-unit message entry, when there is a mismatch between the previous response message stored in the response table and the newly received response message and decrementing (until 0) said mismatch counter when there is no mismatch between these response messages, and using the mismatch counters as a measure for the system performance in such a way, that when the mismatch counter for one control-unit message entry in the table exceeds a predetermined value, the corresponding entry will be cleared and the mismatch counter (MiCt) will be re-initialized.

5. An apparatus for implementing the method according to claim 1 in a system comprising a controlling unit and a controlled unit controlled by said controlling unit, the controlling unit sending control-unit messages (commands and/or requests) to the controlled unit and the controlled unit responding to these control-unit messages by sending response messages (acknowledgements and/or information words) back to the controlling unit, and the controlling unit requiring the response messages back within a certain maximum acceptable delay time, wherein the transmission of messages from the controlling unit to the controlled unit and back comprises a total delay exceeding said maximum acceptable delay time and the apparatus comprising a storage means for a response table and means for storing and updating the response table which is positioned close to the controlling unit, the response table comprising control-unit messages previously sent from the controlling unit to the controlled unit and corresponding response messages previously received from the controlled unit in response to these control-unit messages and means for using this response table as a look-up table for generating a pseudo-response message to each control-unit message within the maximum acceptable delay time accepted by the controlling unit, which pseudo-response message is the most recently received response message to the corresponding control-unit message.

6. An apparatus according to claim 5, wherein the means for updating of the response table comprises a message queue memory and means for storing the control-unit message in the message queue memory and means for receiving the corresponding response message from the controlled unit, storing the control-unit message and the associated response message in the response table, overwriting a possible previous control-unit message with associated response message with an identical control-unit message and an associated, possibly diverging, response message.

7. An apparatus according to claim 6, wherein the means for updating the response table further comprises means for validation of response messages before using these for updating the response table.

8. An apparatus according to claim 6, wherein the means for updating the response table further comprises a mismatch counter (MiCt) for each control-unit message entry and means for incrementing the mismatch counter (MiCt), when there is a mismatch between the previous response message stored in the response table and the newly received response message and for decrementing (until 0) said mismatch counter when there is no mismatch between these response messages, and means for using the mismatch counters as a measure for the system performance in such a way, that when the mismatch counter for one control-unit message entry in the table exceeds a predetermined value, the corresponding entry will be cleared and the mismatch counter (MiCt) will be re-initialized.

* * * * *